United States Patent
Hügel et al.

(10) Patent No.: US 12,038,339 B2
(45) Date of Patent: Jul. 16, 2024

(54) RELATIVE-PRESSURE SENSOR COMPRISING A DRYING CHAMBER

(71) Applicant: Endress+Hauser SE+Co. KG, Maulburg (DE)

(72) Inventors: Michael Hügel, Offenburg (DE); Frank Volz, Freiburg (DE); Nils Ponath, Lörrach (DE); Armin Rupp, Weil am Rhein (DE)

( * ) Notice: Subject to any disclaimer, the term of this patent is extended or adjusted under 35 U.S.C. 154(b) by 288 days.

(21) Appl. No.: 17/756,786

(22) PCT Filed: Nov. 20, 2020

(86) PCT No.: PCT/EP2020/082845
§ 371 (c)(1),
(2) Date: Jun. 2, 2022

(87) PCT Pub. No.: WO2021/110429
PCT Pub. Date: Jun. 10, 2021

(65) Prior Publication Data
US 2023/0012816 A1    Jan. 19, 2023

(30) Foreign Application Priority Data
Dec. 2, 2019    (DE) .................... 10 2019 132 723.7

(51) Int. Cl.
*G01L 19/06*   (2006.01)
*G01L 9/00*    (2006.01)
*G01L 13/02*   (2006.01)

(52) U.S. Cl.
CPC ........ *G01L 19/0654* (2013.01); *G01L 9/0041* (2013.01); *G01L 13/025* (2013.01)

(58) Field of Classification Search
CPC ........... G01L 19/0654; G01L 7/08–088; G01L 9/0041–008; G01L 13/025; G01L 13/026
See application file for complete search history.

(56) References Cited

U.S. PATENT DOCUMENTS 9,228,914 B2 * 1/2016 Uehlin ................ B01J 20/261
9,239,251 B2 * 1/2016 Lopatin ............... B01J 20/183
10,168,241 B2 * 1/2019 Hugel .................. G01L 19/144

FOREIGN PATENT DOCUMENTS

| CN | 1502039 A | 6/2004 |
| CN | 102187191 A | 9/2011 |

(Continued)

*Primary Examiner* — Justin N Olamit

(57) ABSTRACT

A relative-pressure sensor determines the pressure of a medium in relation to an atmospheric pressure. The sensor includes a housing having a measuring element located in the housing, wherein the pressure to be measured acts upon an outer surface of the measuring element. The surface is in contact with the medium. The sensor also includes a reference-pressure supply, which supplies an inner surface of the measuring element with atmospheric pressure in the form of ambient air, and an evaluation unit, which determines the pressure of the medium from a variable determined using the measuring element. A drying chamber takes-up atmospheric humidity from the ambient air that is supplied via the reference-pressure supply. The drying chamber has a drying module comprising a container and a humidity-adsorbing material that is completely surrounded by the container.

11 Claims, 2 Drawing Sheets

(56) References Cited

FOREIGN PATENT DOCUMENTS

| | | | |
|---|---|---|---|
| CN | 102834715 | A | 12/2012 |
| CN | 106461491 | A | 2/2017 |
| CN | 107003197 | A | 8/2017 |
| CN | 110243534 | A | 9/2019 |
| DE | 102010003709 | A1 | 10/2011 |
| DE | 102010062295 | A1 | 6/2012 |
| DE | 102011080142 | A1 | 1/2013 |
| DE | 102014108780 | A | 6/2014 |
| DE | 102014108780 | A1 | 12/2015 |
| EP | 1070948 | A1 | 1/2001 |
| JP | 2001108549 | A | 4/2001 |
| JP | 202206979 | A | 7/2002 |
| JP | 2002206979 | A | 7/2002 |

\* cited by examiner

RELATIVE-PRESSURE SENSOR COMPRISING A DRYING CHAMBER

CROSS-REFERENCE TO RELATED APPLICATIONS

The present application is related to and claims the priority benefit of DE Patent Application No. 10 2019 132 723.7, filed on Dec. 2, 2019, and International Patent Application No. PCT/EP2020/082845, filed on Nov. 20, 2020, the entire contents of which are incorporated herein by reference.

TECHNICAL FIELD

The present invention relates to a relative-pressure sensor for determining a pressure of a medium in relation to an atmospheric pressure, the sensor comprising a housing, a measuring element arranged in the housing, wherein the pressure to be measured acts upon an outer surface of the measuring element, said surface being in contact with the medium, a reference-pressure supply, which supplies an inner surface of the measuring element with atmospheric pressure in the form of ambient air, an evaluation unit, which determines the pressure of the medium from a variable determined using the measuring element, and at least one drying chamber arranged in the housing for taking up atmospheric humidity from the ambient air supplied through the reference-pressure supply. The medium whose pressure is to be determined is in this case liquid or gaseous.

BACKGROUND

In pressure measurement technology, absolute-pressure sensors, differential-pressure sensors and relative-pressure sensors are known. Absolute-pressure sensors determine the prevailing pressure absolutely, i.e., in relation to vacuum, while differential-pressure sensors determine the difference between two different pressures. In the case of relative-pressure sensors, the pressure to be measured is determined relative to a reference pressure, wherein the atmospheric pressure prevailing in the environment of the relative-pressure sensor serves as reference pressure. Relative-pressure sensors have a pressure-sensitive measuring element, generally a membrane, which is arranged on the process side in the interior of the relative-pressure sensor so that the pressure to be measured of the medium acts upon the outer surface of the measuring element. The atmospheric pressure, which is supplied to the measuring element from the environment by means of a reference-pressure supply, acts upon the inner surface of the measuring element. The measuring element bends as a function of the relative pressure present, the relative pressure being formed from the difference between the pressure to be measured and the atmospheric pressure. This bending is converted by means of an evaluation unit into an electrical signal which depends on the relative pressure and is then available for further processing or evaluation. The companies of the Endress+Hauser Group manufacture and market a variety of such relative-pressure sensors.

The relative-pressure sensor can determine the pressure to be measured according to various methods, for example capacitively or piezo-resistively.

In a capacitive relative-pressure sensor, a membrane is provided with a first electrode and the side of a measuring chamber opposite the membrane is provided with a second and in some cases with a third electrode. The second electrode together with the first electrode forms a measuring capacitor, which is particularly sensitive to bending of the membrane so that the relative pressure can be determined from the capacitance value. The third electrode serves as a reference electrode and together with the first electrode forms a reference capacitor, which is substantially pressure-independent and is influenced by temperature, atmospheric humidity and other environmental parameters. By means of the capacitance of the reference capacitor, interference signals, such as temperature-dependent capacitance changes, can thus be compensated.

Another group of known relative sensors has a membrane on which strain-sensitive elements, such as strain gauge strips, are arranged. The strain gauge strips are frequently arranged in the form of a Wheatstone measuring bridge. The resistance of the strain gauge strips is dependent on the bending of the membrane and is evaluated to determine the applied pressure.

Piezo-resistive relative sensors have a sensitive layer, whose electrical properties depend on the applied pressure. This layer is not directly acted upon by the pressure to be measured but is in contact with the medium via a diaphragm seal. The diaphragm seal can be a solid body or a pipe filled with an incompressible liquid, such as oil, and sealed against the process by a pressure-sensitive membrane.

Relative-pressure sensors are frequently used in industrial processes in which they are exposed to great temperature fluctuations and temperature differences between the process and the environment. In the event of sudden cooling, the dew point of the air in an interior of the relative-pressure sensor can be exceeded, which leads to the atmospheric humidity condensing on cold parts within the relative-pressure sensor. The atmospheric humidity can, especially, pass through the opening in the relative-pressure sensor to the environment, which is necessary for providing the reference pressure for the measuring element, and through the reference-pressure supply into the relative-pressure sensor.

The evaluation unit is generally very sensitive to humidity. For reliable determination of the pressure, it must therefore be ensured that no or only a little humidity enters or condenses within the relative-pressure sensor. Ideally, the relative-pressure sensor is constructed such that only dry air reaches the measuring element and the evaluation unit. As a rule, the reference-pressure supply conducts the ambient pressure from an opening in the relative-pressure sensor, which is frequently arranged in the housing of the relative-pressure sensor, to the inner surface of the measuring element or of the membrane. The reference-pressure supply between the opening of the relative-pressure sensor and an interior of the relative-pressure sensor is frequently designed as a long, in some cases winding path in order to reduce diffusion of humidity into the interior of the relative-pressure sensor. In addition, in some cases, a drying chamber is arranged between the opening of the relative-pressure sensor and the measuring element, the drying chamber removing humidity from the supplied ambient air from the reference-pressure supply and thus drying it.

Various drying chambers are known from the prior art.

DE 10 2014 108 780 A1 describes a drying module for a relative-pressure transducer. The drying module comprises a module housing which has an interior with a drying agent and a reference-pressure supply, which extends from an opening in the module housing facing the environment and running through the module housing to an opening in the relative-pressure transducer. Within the module housing, the reference-pressure supply takes the form of a capillary, which is either partially permeable to humidity or has an opening along the capillary for exchanging air or humidity with the drying agent. The drying module is fastened to the opening of the relative-pressure transducer by means of a connecting element. It is essential here that the connecting element be fastened to the opening of the relative-pressure transducer such that the ambient air is guided into the relative-pressure transducer only through the reference-pressure supply and that only dried ambient air thus enters the relative-pressure transducer. The intention is to prevent humid ambient air from entering the relative-pressure transducer directly without the detour through the drying module. Since the drying module is designed to be exchangeable and the connection to the relative-pressure transducer must consequently be releasable, it is not easy to ensure that only ambient air dried in the drying module is conducted into the relative-pressure transducer. At the same time, the drying module has a limited service life since the drying agent is connected to the ambient air via a short reference-pressure supply and can thus take up humidity quickly.

DE 10 2010 003 709 A1 describes a relative-pressure sensor comprising a housing, a measuring element, an evaluation unit, a reference-pressure supply and a drying chamber, which is arranged in the housing and contains a humidity-adsorbent material or substantially consists of the humidity-adsorbent material. The humidity-adsorbent material can take the form of a molded, sintered or composite body. The reference-pressure supply takes the form of a long capillary between an opening in the housing of the relative-pressure sensor and the drying chamber in order to reduce the diffusion of humidity into an interior of the relative-pressure sensor. A section of the reference-pressure supply also lies within the drying chamber and this section consists of a humidity-permeable material to enable the drying chamber to take up humidity from the ambient air within the reference-pressure supply. The humidity-permeable section of the reference-pressure supply, which is typically a tube, must be fastened to the measuring element. Since the tube ideally has a very small inner diameter in order to allow as little humidity as possible to diffuse through the tube, fastening the tube to the measuring element is sometimes very complicated. In addition, a closure surface is required on the side of the drying chamber facing away from the measuring element. The tube is introduced into the closure surface in such a way that the reference-pressure supply into the drying chamber runs exclusively through the tube. The closure surface can be a glass feedthrough which is attached to the relative-pressure sensor in an additional process step.

SUMMARY

Proceeding from the cited prior art, the object of the present invention is to provide a drying module which can be introduced in a simple manner into the relative-pressure sensor in such a way that only dried air reaches the measuring element and the evaluation unit.

The object is achieved according to the invention by a relative-pressure sensor for determining a pressure p1 of a medium in relation to an atmospheric pressure p2, the sensor comprising a housing,
a measuring element arranged in the housing, wherein the pressure p1 to be measured acts upon an outer surface of the measuring element, said surface being in contact with the medium,
a reference-pressure supply, which supplies the atmospheric pressure p2 in the form of ambient air to an inner surface of the measuring element,
an evaluation unit, which determines the pressure p1 of the medium from a variable determined using the measuring element,
and at least one drying chamber arranged in the housing for taking up atmospheric humidity from the ambient air supplied through the reference-pressure supply.

In this case, the drying chamber has a drying module comprising a container and a humidity-adsorbent material that is completely surrounded by the container, wherein a bottom surface of the container facing the measuring element is designed to be at least partially humidity-permeable, wherein the container is designed to be humidity-impermeable with the exception of the bottom surface.

The use of the container for inclusion of the humidity-adsorbent material ensures an additional stabilization of the humidity-adsorbent material. For example, the humidity-absorbent material can be filled into the container in powder form. If a molded body is used as a humidity-adsorbent material and loses its shape when saturation with humidity is reached, i.e., for example, it develops cracks or disintegrates into several pieces, the container ensures that the humidity-adsorbent material is not able to disperse within the interior of the relative-pressure sensor.

The embodiment of the bottom surface as at least partially humidity-permeable is particularly advantageous for such relative-pressure sensors whose evaluation unit is arranged in the vicinity of the measuring element or at least between the bottom surface and the measuring element. The drying module thus ensures effective drying of the air in the vicinity of the evaluation unit.

Since only the bottom surface is designed to be partially permeable to humidity, the humidity from the reference-pressure supply diffuses only slowly into the container and into the humidity-adsorbent material. Consequently, accommodating the humidity-absorbent material in the container significantly reduces the rate of humidity take-up by the humidity-adsorbent material. This also means that the humidity-adsorbent material becomes saturated with humidity less rapidly.

The slower saturation of the humidity-adsorbent material facilitates not only the storage of the drying module but also the installation of the drying module in the relative-pressure sensor. A humidity-adsorbent material that is not surrounded by the container takes up humidity very rapidly as soon as it is exposed to the ambient air. This is a great disadvantage when installing the humidity-adsorbent material since installation takes place under ambient conditions and the humidity-adsorbent material already takes up a not insignificant amount of humidity during installation. In the solution according to the invention, this problem is however significantly reduced by the use of the only partially humidity-permeable container in which the humidity-adsorbent material is accommodated, since the drying module is able to take up humidity from the environment much more slowly. At the same time, this leads to easier storage of the drying module since it can be stored longer due to the slower saturation of the drying module.

By limiting the humidity take-up into the drying module, the humidity-adsorbent material draws less humidity from the environment. Typically, in relative-pressure sensors, a tube is guided through the drying chamber and the drying chamber, on its side facing away from the measuring element, is closed off with a glass feedthrough through which the tube is guided. The combination of a tube with the smallest possible inner diameter and glass feedthrough is usually necessary so that the ambient air and thus the humidity diffuses into the drying chamber only slowly.

Without the use of a tube and a glass feedthrough, a drying chamber according to the previous publications would be permanently extracting humidity from the ambient air within the relative-pressure sensor, which would accelerate the diffusion of humidity from the environment of the relative-pressure sensor into the interior of the relative-pressure sensor. This would lead to rapid saturation of the humidity-adsorbent material in the drying chamber. In the solution according to the invention, on the other hand, the drawing of humidity from the interior of the relative-pressure sensor is significantly reduced by accommodating the humidity-adsorbent material in the only partially humidity-permeable container. Additional elements, such as tube and glass feedthrough, which are intended to limit the entry of humidity into the drying module, are thus not necessary. In addition, the significantly reduced drawing of humidity by the drying chamber makes it possible to reduce the volume of the drying chamber and of the humidity-adsorbent material contained therein in comparison to previous solutions. Space, material and costs are saved in the present invention by reducing the size of the drying module and eliminating elements such as tube and glass feedthrough.

At this point, it should be pointed out that the reference-pressure supply from the opening around the housing of the relative-pressure sensor to the drying chamber should be designed such that the diffusion of humidity into the interior of the relative-pressure sensor is slowed down. This can be done, for example, by a long, capillary-shaped tube as already known from DE 10 2010 003 709 A1. However, other embodiments of the reference-pressure supply are also possible. The reference-pressure supply can thus also take the form of a groove in the wall of a component of the relative-pressure sensor. The use of the drying module according to the invention without a long, winding reference-pressure supply results in faster saturation of the drying module with humidity.

In one embodiment, the base body of the drying module is an annular chamber which has a feedthrough along a longitudinal axis of the base body, said feedthrough guiding the connecting lines of the electronics and the reference-pressure supply to the measuring element.

In a preferred embodiment, a bottom surface of the container facing the measuring element is designed as a separate bottom unit, wherein a connection between the bottom unit and the container is designed to be form-fitting and/or humidity-impermeable. The possibility of detaching the bottom unit from the container and of connecting it to the container makes filling the container with the humidity-adsorbent material easy. At the same time, it allows simple production of the drying module since the container and the bottom unit should consist of different materials. For example, container and bottom unit can be produced by additive manufacturing.

Advantageously, the bottom unit can be plugged into the container. This enables easy sealing of the drying module. When the drying module is replaced, in the case of saturation of the humidity-adsorbent material with humidity, the same container can be reused and only the humidity-adsorbent material changed.

In a further embodiment, the drying module is designed in several parts in such a way that the annular chamber with regard to a longitudinal section is divided into at least two individual chambers. In the embodiment of the drying module as a single annular chamber, the connecting lines of the electronics have to be guided in a complicated manner through the feedthrough of the drying module. When the drying module is divided into two chambers, the connecting lines can be passed through between the two chambers in a simple manner and the chambers can then be put together.

In the case of a two-part drying module, the two chambers are preferably designed symmetrically in such a way that the total volume of the annular chamber is evenly distributed over the two chambers.

In one possible embodiment, the container has an enlargement of the outer diameter in an end region facing the measuring element, wherein the housing has a section with an enlargement of the inner diameter which corresponds to the section with the enlargement of the outer diameter of the container, wherein the corresponding sections of the enlargement of the outer diameter of the container and of the enlargement of the inner diameter of the housing engage in a form-fitting manner with one another after introduction of the drying module into the housing. This ensures that the ambient air is conducted to the measuring element exclusively along the reference-pressure supply through the feedthrough in the drying module.

In a further embodiment, the humidity-impermeable material of the container is a polymer or a metal-coated polymer.

In an additional embodiment, the humidity-permeable region of the bottom unit is made of PA or Gore.

It is advantageous here if a molded body comprising a polymer matrix and zeolite is provided as a humidity-adsorbent material. Such molded bodies are known, for example, from DE 10 2010 062 295 A1 or DE 10 2011 080 142 A1.

The cross-section of the outer wall of the drying module facing the housing advantageously has a waveform superimposed on the circular basic profile. The waveform superimposed on the basic profile brings about compensation for tolerances of the diameter of the drying module and of the diameter of the housing during installation of the drying module. After installation of the drying module in the housing, the waveform ensures a vibration-free state of the drying module in the housing.

The invention is explained in greater detail with reference to the following FIGS. 1-2b. The following is shown:

DETAILED DESCRIPTION

The present invention is applicable to a variety of relative-pressure sensors which are based on different measuring principles. Relative-pressure sensors are used for determining a pressure p1 of a medium in relation to an atmospheric pressure p2, the sensors comprising a housing, a measuring element arranged in the housing, wherein the pressure p1 to be measured acts upon an outer surface of the measuring element, said surface being in contact with the medium, a reference-pressure supply, which supplies an inner surface of the measuring element with atmospheric pressure p2 in the form of ambient air, an evaluation unit, which determines the pressure p1 of the medium from a variable determined using the measuring element, and at least one drying chamber arranged in the housing for taking up atmospheric humidity from the ambient air supplied through the reference-pressure supply. Corresponding relative-pressure sensors are manufactured and marketed by the applicant, for example, under the names "Cerabar" and "Ceraphant."

Figure 1:
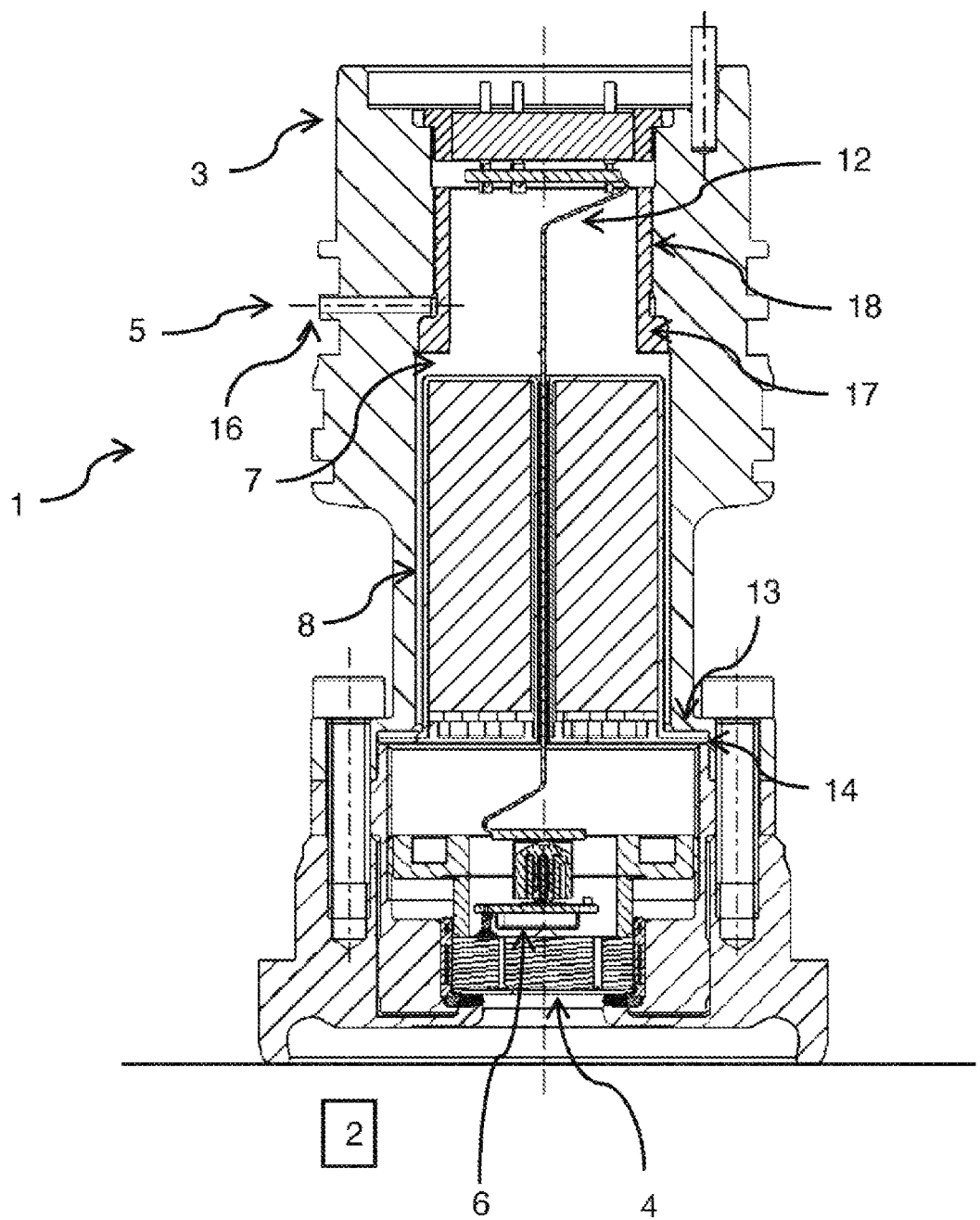
FIG. 1 shows a schematic diagram of the relative-pressure sensor according to the present disclosure.

FIG. 1 shows a relative-pressure sensor 1 comprising the housing 3, the measuring element 4 facing the medium 2, the reference-pressure supply 5 and the evaluation unit 6. The reference-pressure supply 5 conducts the ambient air from the environment of the relative-pressure sensor 1 through an opening 16 in the relative-pressure sensor 1 and along a groove 18 in a bushing 17 into the interior of the relative-pressure sensor 1. The groove 18 serves to limit the speed of diffusion of humidity into the relative-pressure sensor 1 and is designed such that the reference-pressure supply 5 runs exclusively along the groove 18 from the opening 16 into an interior of the bushing 17. However, limiting the humidity diffusion can also be fulfilled by other embodiments, such as a long capillary, which connects the opening 16 to the interior of the relative-pressure sensor 1.

Figure 2A:
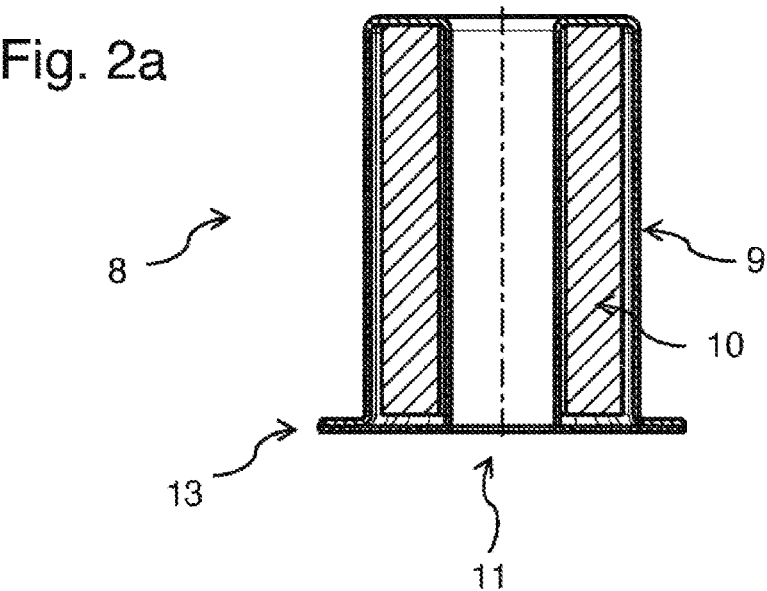
FIG. 2a shows a possible embodiment of the one-piece drying module.

The relative-pressure sensor also has the drying chamber 7 in which the drying module 8 is installed. In FIG. 1, the drying module 8 is designed as a two-part annular chamber, wherein the connecting lines of the electronics 12 and the reference-pressure supply 5 run through the annular chamber. Other embodiments of the drying module 8 are therefore not excluded; FIG. 2a shows a further possible embodiment. On the side of the drying module 8 facing the medium 2, the drying module 8 has an enlargement of the outer diameter of the container 13, which engages with an enlargement of the inner diameter of the housing 14 in a form-fitting manner.

Figure 2B:
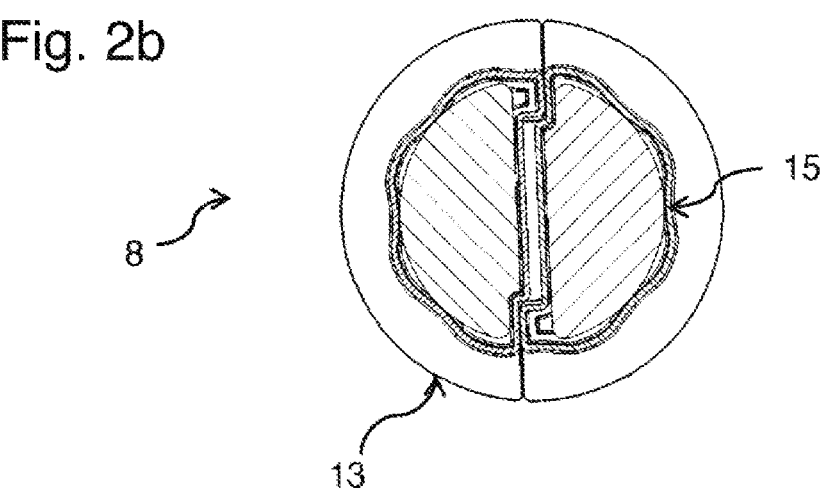
FIG. 2b shows a possible embodiment of the two-part drying module.

FIGS. 2a, b show the drying module 8 according to the invention, consisting of the container 9, the at least partially humidity-permeable bottom unit 11 and the humidity-adsorbent material 10, which, without limiting generality, is provided as a molded body comprising a polymer matrix and zeolite. The container 9 completely surrounds the humidity-adsorbent material 10 and is designed to be impermeable to humidity with the exception of the bottom unit 11. The bottom unit 11 can be designed as part of the container or as a separate and detachable bottom unit, wherein the connection between the bottom unit 11 and the container 9 is designed to be humidity-impermeable and/or form-fitting. In FIG. 2a, the drying module 8 is designed as a one-piece annular chamber and the bottom unit 11 is plugged into the container 9. This does not exclude other possibilities for connecting the bottom unit 11 to the container 9. The humidity-impermeable material of the container is, for example, a polymer or a metal-coated polymer, whereas the humidity-permeable region of the bottom unit is made of PA or Gore. Other humidity-permeable or humidity-impermeable materials are therefore not ruled out. In the direction of the measuring element 4, the drying module 8 has an enlargement of the outer diameter of the container 13, which is also found in the bottom unit. In FIG. 2b, the drying module 8 is designed as a two-part drying module, consisting of two volume-symmetrical chambers. Of course, the drying module can also be divided into two parts in other ways. The outer wall 15 of the drying module 8 has a wave-like cross-section.

The invention claimed is:

1. A relative-pressure sensor for determining a pressure of a medium in relation to an atmospheric pressure, the sensor comprising
a housing,
a measuring element arranged in the housing, wherein the pressure to be measured acts upon an outer surface of the measuring element, said surface being in contact with the medium,
a reference-pressure supply, which supplies the atmospheric pressure in the form of ambient air to an inner surface of the measuring element,
an electrical evaluation unit, which determines the pressure of the medium from a variable determined using the measuring element, and
at least one drying chamber arranged in the housing for taking up atmospheric humidity from the ambient air supplied through the reference-pressure supply,
wherein the drying chamber has a drying module comprising a container and a humidity-adsorbent material that is completely surrounded by the container, wherein a bottom surface of the container facing the measuring element is designed to be at least partially humidity-permeable, wherein the container is designed to be humidity-impermeable with the exception of the bottom surface.

2. The relative-pressure sensor of claim 1,
wherein a base body of the drying module is an annular chamber which has a feedthrough along a longitudinal axis of the base body, said feedthrough guiding the connecting lines of electronics and the reference-pressure supply to the measuring element.

3. The relative-pressure sensor of claim 1, wherein the bottom surface of the container facing the measuring element is designed as a separate bottom unit, wherein a connection between the bottom unit and the container is designed to be form-fitting and/or humidity-impermeable.

4. The relative-pressure sensor of claim 3,
wherein the bottom unit can be plugged into the container.

5. The relative-pressure sensor of claim 1, wherein the drying module is designed in several parts in such a way that an annular chamber with regard to a longitudinal section is divided into at least two individual chambers.

6. The relative-pressure sensor of claim 5,
wherein in the case of a two-part drying module, the two chambers are designed to be symmetrical in such a way that the total volume of the annular chamber is evenly distributed over the two chambers.

7. The relative-pressure sensor of claim 1, wherein the container has an enlargement of an outer diameter in an end region facing the measuring element, wherein the housing has a section with an enlargement of an inner diameter which corresponds to the section with the enlargement of the outer diameter of the container, wherein the corresponding sections of the enlargement of the outer diameter of the container and of the enlargement of the inner diameter of the housing engage in a form-fitting manner with one another after introduction of the drying module into the housing.

8. The relative-pressure sensor of claim 1,
wherein the humidity-impermeable material of the container is a polymer or a metal-coated polymer.

9. The relative-pressure sensor of claim 1, wherein the humidity-permeable region of the bottom unit is made of PA or Gore.

10. The relative-pressure sensor of claim 1, wherein a molded body comprising a polymer matrix and zeolite is provided as humidity-adsorbent material.

11. The relative-pressure sensor of claim 1, wherein a cross-section of an outer wall of the drying module facing the housing has a waveform superimposed on the circular basic profile.

* * * * *